(12) United States Patent
Sheikholeslami et al.

(10) Patent No.: US 6,858,797 B2
(45) Date of Patent: Feb. 22, 2005

(54) SUPPORT MEMBER FOR AN ASSEMBLY

(75) Inventors: Kusha A. Sheikholeslami, Wilmington, DE (US); Josef Steff, Meinheim (DE)

(73) Assignee: Gore Enterprise Holdings, Inc., Newark, DE (US)

( * ) Notice: Subject to any disclaimer, the term of this patent is extended or adjusted under 35 U.S.C. 154(b) by 0 days.

(21) Appl. No.: 10/695,222

(22) Filed: Oct. 28, 2003

(65) Prior Publication Data

US 2004/0112625 A1 Jun. 17, 2004

Related U.S. Application Data

(63) Continuation-in-part of application No. 10/303,382, filed on Nov. 22, 2002, now abandoned.

(51) Int. Cl.[7] ............................................. H02G 3/04
(52) U.S. Cl. ...................... 174/48; 174/68.1; 174/68.3; 248/68.3; 439/207
(58) Field of Search ........................ 174/48, 68.1, 68.3, 174/135, 70 C, 21 R, 36; 439/207; 248/68.1

(56) References Cited

U.S. PATENT DOCUMENTS

| | | |
|---|---|---|
| 3,664,619 A | 5/1972 | Heidrich et al. |
| 3,779,003 A | 12/1973 | Boissevain et al. ........... 59/78.1 |
| 4,081,602 A | 3/1978 | Paniri et al. ................. 174/103 |
| 4,392,344 A | 7/1983 | Gordon, deceased et al. ............................ 59/78.1 |
| 4,412,092 A * | 10/1983 | Hansell, III .................... 174/36 |
| 4,504,258 A | 3/1985 | Tanaka et al. ............... 474/263 |
| 4,570,437 A | 2/1986 | Moritz ......................... 59/78.1 |
| 4,658,577 A | 4/1987 | Klein ........................... 59/78.1 |
| 4,701,154 A | 10/1987 | Rausch ........................ 474/205 |
| 5,134,251 A * | 7/1992 | Martin ......................... 174/136 |
| 5,173,361 A | 12/1992 | Yamashita et al. ........... 428/245 |
| 5,230,420 A | 7/1993 | Meier et al. ................ 198/750 |
| 5,322,480 A | 7/1994 | Meier et al. ................. 474/145 |
| 5,421,080 A | 6/1995 | Bellavance et al. ............ 29/825 |
| 5,448,670 A | 9/1995 | Blew et al. .................. 385/112 |
| 6,107,565 A * | 8/2000 | O'Rourke ................. 174/21 JS |
| 6,161,373 A | 12/2000 | Heidrich et al. ............. 59/78.1 |
| 6,167,689 B1 | 1/2001 | Heidrich et al. ............. 59/78.1 |
| 6,173,560 B1 | 1/2001 | Weber ......................... 59/78.1 |
| 6,358,171 B1 | 3/2002 | Whitfield .................... 474/266 |
| 6,442,318 B1 | 8/2002 | Goldman .................... 385/114 |
| 6,653,568 B1 * | 11/2003 | Davis ........................ 174/68.3 |

OTHER PUBLICATIONS

Gortrac—Cable and Hose Carriers (visited Mar. 17, 2003) <http://www.gortrac.com/gortrac.htm>.
Gortube—Cable and Hose Carriers (visited Mar. 17, 2003) <http://www.gortrac.com/gortube.htm>.
igus Energy Chain® Cable Carrier Systems (visited Mar. 17, 2003) <http://www.aboveboardelectronics.com/igus/echain/index.html>.
Nylatrac—Cable and Hose Carriers (visited Mar. 17, 2003) <http://www.gortrac.com/nylatrac.htm>.
Nylatube—Cable and Hose Carriers (visited Mar. 17, 2003) <http://www.gortrac.com/nylatube.htm>.
Quantum (visited Mar. 17, 2003) <http://www.kabelschlepp.com/quantum.htm>.

* cited by examiner

*Primary Examiner*—Dhiru R. Patel
(74) *Attorney, Agent, or Firm*—Eric J Sheets

(57) ABSTRACT

The present invention is directed to support members for assemblies of conductors, conduits, or other means of conveying energy, gases, or liquids. The invention has a series of non-interlocking solids disposed along the length of a flexible base material. The non-interlocking solids have motion-limiting portions that contact similar portions on adjacent solids to restrict the movement of the support member in one direction, while permitting the support member to curve or bend in an opposite direction. The invention is also directed to assemblies incorporating the support members.

92 Claims, 14 Drawing Sheets

SUPPORT MEMBER FOR AN ASSEMBLY

CROSS-REFERENCE TO RELATED APPLICATION

This application is a continuation-in-part of application Ser. No. 10/303,382, filed Nov. 22, 2002 now abandoned.

FIELD OF THE INVENTION

The present invention relates to the field of mechanical supports. In particular, the invention is directed to mechanical supports for use with conductors designed to transmit electromagnetic energy and/or conduits that carry gases or fluids. The mechanical supports provide a wide range of motion in one direction and a limited range of motion in an opposite direction. The invention is also directed to assemblies incorporating the mechanical supports.

BACKGROUND OF THE INVENTION

The desire to have movable ribbon cables and other assemblies of electrical conductors, optical conductors, or pneumatic conduits in industrial machinery lead to the development of flexible supports for the assemblies. Many of the supports have taken the form of so-called "cable tracks." Cable tracks are made of a linear series of interlocking segments that partially surround and cradle a group of conductors or conduits. The interlocking segments often have surface features that interact to confine the range of motion of the cable tracks and the associated conductors or conduits in order to prevent excessive bending or kinking of the conductors or conduits. In some applications, the motion of a cable track ranges between a flattened configuration and a configuration that curves in only one direction. Cable tracks are limited in many applications by their bulky size, weight, large bend radius, mechanical vibration, power consumption, and rapid wear. In some applications, such as manufacturing in a clean room environment, wear of the cable track material often produces particulates that contaminate the work area or work product.

In an effort to reduce the size and weight of cable tracks, European Patent No. 528,141 to Elocab Sonderkabel GmbH & Co. teaches the incorporation of a cable track-like support element into a cable assembly. In the Elocab Sonderkabel assembly, the support element is made of a linear chain of interlocking segments with surface features that contact and limit the relative motion of adjacent segments. The support element is placed between two or more parallel electrical or optical conductors. An "enveloping casing" is extruded over the combination to form the finished cable assembly.

Although the size and weight of the cable track-like support element in the Elocab Sonderkabel assembly may be reduced from those of conventional cable tracks, many of the problems of conventional cable tracks remain with the Elocab Sonderkabel assembly. For example, movement between adjacent interlocking segments of the support element causes mechanical vibration to be generated in the support element as the support element is moved through an arc. As the support element is moved through an arc, the fixed pitches and radii of the interlocking segments often cause the support element to bounce or hop. This bouncing or hopping is commonly referred to as "cogging." In the manufacture of semiconductors and other high precision devices, cogging can limit the speed and undermine the mechanical precision of machinery used to manufacture the devices. If cogging could be eliminated from a support member, the result would be a support member that operates in a smooth, quiet, and more precise manner.

Just as with conventional cable tracks, the support element in the Elocab Sonderkabel assembly suffers from wear between contact surfaces of the interlocking segments of the support elements. As the contact surfaces wear, the joints connecting the segments together loosen and allow the support element to sag. Once sagging occurs, the support element can buckle and cause the useful life of the support element to rapidly decrease. At high acceleration rates, sagging can cause the support element to buckle, further decreasing the useful life of the support element.

In addition to the problems the Elocab Sonderkabel assembly shares with conventional cable tracks, the operation of Elocab Sonderkabel assembly is further limited by the methods and materials used to construct the assembly. In the Elocab Sonderkabel assembly, the enveloping jacket is extruded over the support element and associated electrical conductors. The use of an extrusion method to form the enveloping jacket limits the types of materials that can be used to form the jacket. The types of materials that are suitable for extrusion of the enveloping jacket can reduce the flexibility, range of motion, and useful life of the assembly. These limitations become particularly apparent in applications requiring small bend radii, rapid and precise reciprocating motion of the assembly over long periods of time. These limitations are exacerbated when multiple assemblies are stacked on top of one another or when an assembly rubs against a surface.

As demand for high precision manufacturing, clean room environments, and other mechanically rigorous applications increases, conventional cable supports with interlocking segments will find increasingly fewer uses.

In view of the limitations of conventional cable supports there is a need for a lightweight support member having qualities including a high degree of flexibility, low mechanical noise, a small bend radius, low particle generation, and long service life. To achieve these and other goals, the support member would not use interlocking segments. Rather, the support member would be made of a length of flexible material with a series of non-interlocking motion-limiting elements attached to the flexible material. The support member would have a wide range of motion in one direction and essentially no range of motion in an opposite direction. The support member would be easy to manufacture and incorporate into an assembly of conductors or conduits. Such a supported cable assembly would be particularly useful with machines that perform rapid and precise mechanical movements over long periods of time. In manufacturing applications requiring a clean environment, the supported cable assembly could be provided with an external jacket that would generate very few particulates during use.

SUMMARY OF THE INVENTION

The present invention is directed to support members for various types of assemblies such as electrical or optical cable assemblies, fluid or gas transporting assemblies, and assemblies having electrical shielding. The invention is also directed to assemblies incorporating the support member.

The invention is particularly useful with high speed, high accuracy machinery involved in precision manufacturing, testing, and inspection. In semi-conductor and other electronics manufacture, for example, individual movements of manufacturing machinery can be as small as a few nanometers in distance. With conventional cable track supports and cable assemblies, such mechanical precision can be severely compromised by vibrations and other mechanical noise generated by the supports and their associated assemblies. The size and bulk of conventional cable supports and assemblies can also limit the flexibility, speed, and power requirements of the manufacturing equipment. Contamination of a work space or work piece with particulates produced by conventional supports and assemblies is another problem often encountered in precision manufacturing.

The present invention addresses these concerns by providing a lightweight support member with a high degree of flexibility, low mechanical noise, a small bend radius, long service life, and essentially no particulation. The support members are constructed of a series of non-interlocking, motion-limiting, elements attached to a length of flexible material. The resulting support members have a wide range of motion in one direction and essentially no range of motion in an opposite direction. The support member can support its own weight when extended a distance of a meter or more. In many embodiments, the support member can also support the weight of an assembly over a distance of about one-half meter or more. The support members are easily manufactured into an assembly by placing one or more support members substantially in parallel with at least one conductor or conduit and enclosing the combination in a polymeric material. The polymeric material is preferably applied to the combination with a lamination process as a means of controlling the thickness of the applied polymeric material. Lamination permits more flexible polymeric materials to be used to enclose the combination than those available with extrusion processes. Flexible polymeric materials do not limit the range of motion of the enclosed combination to the same degree as extruded materials. In addition to flexibility, preferred polymeric materials do not readily abrade, particulate, or wear out prematurely. Lamination is also preferred because it usually requires smaller amounts of polymeric material than extrusion processes. Each of these features contributes to the performance of the assembly.

In one embodiment, the present invention is a support member having a range of motion in one direction and essentially no range of motion in an opposite direction, said support member comprising a length of flexible material, and a plurality of non-interlocking solids attached to said flexible material, wherein adjacent non-interlocking solids have portions that contact one another and restrict bending of said flexible material in one direction of movement, and wherein said portions of said non-interlocking solids separate from one another when said flexible material is activated in an opposite direction of movement, thereby permitting said flexible material to bend and assume a curved configuration.

In yet another embodiment, the present invention is a support member for an assembly having a range of motion in one direction and essentially no range of motion in an opposite direction, said support member comprising a length of flexible material, a plurality of non-interlocking solids attached to said flexible material, and at least one filament attached to said plurality of non-interlocking solids, wherein said at least one filament restricts motion of said flexible material in one direction of movement, and wherein said at least one filament does not restrict motion of said flexible material in an opposite direction of movement, thereby permitting said flexible material to bend and assume a curved configuration.

Further aspects and advantages of the present invention will be apparent to those skilled in the art after reading and understanding the detailed description of preferred embodiments set forth hereinbelow and after viewing the accompanying drawings.

BRIEF DESCRIPTION OF THE DRAWINGS

The foregoing summary, as well as the following detailed description of a preferred embodiment of the invention, will be better understood when read in conjunction with the appended drawings. For purposes of illustrating the invention, there is shown in the drawings an embodiment that is presently preferred. It should be understood, however, that the invention is not limited to the precise arrangement and instrumentality shown. In the drawings.

DETAILED DESCRIPTION OF THE INVENTION

Figure 1:
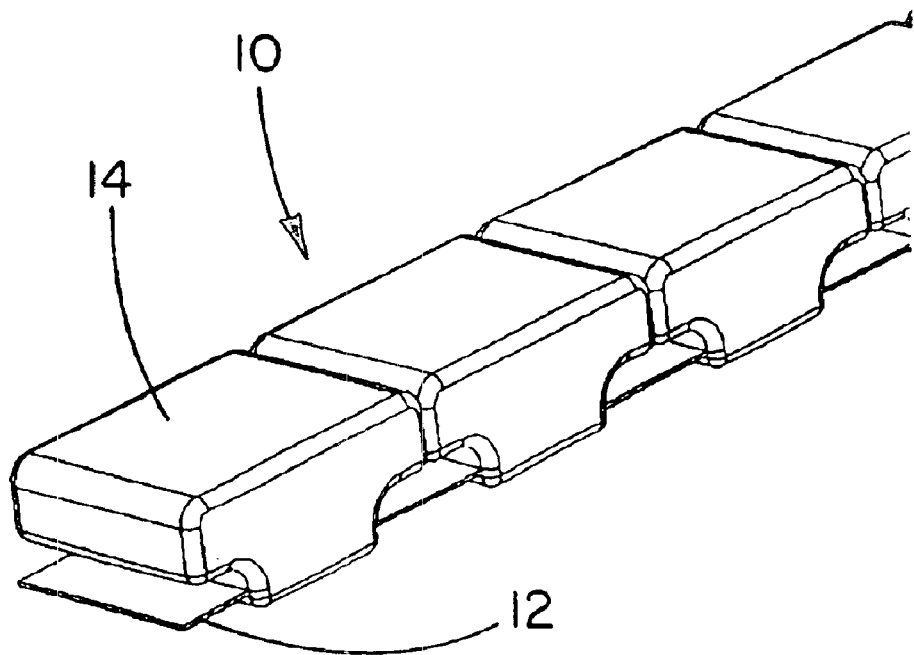
FIG. 1 illustrates a perspective view of a support member of the present invention

The present invention is directed to flexible support members capable of supporting themselves and an assembly of conductors, conduits, channels, or other components incorporating the support member. The support member and associated assemblies alternate between a straightened configuration and a configuration that curves, or arcs, in a single direction. In the straightened configuration, the invention can be extended for a meter or more with essentially no bending or flexing of the support member. In the curved configuration, the invention is very flexible and readily assumes a wide range of bend radii.

In a preferred embodiment, the support member of the present invention (10) is made of a length of flexible material (12) with a series of non-interlocking, motion-limiting, elements (14) attached to the flexible material (FIGS. 1–7). The flexible material is preferably a narrow strip or similar piece of material having a uniform width and thickness. In the most preferred embodiment, the flexible material is flat with a perimeter substantially in the shape of a rectangle. Alternatively, the flexible material can have a cross-section in the form of a square, rectangular, circular, elliptical, ovoid, or other shape and be solid or hollow along its length.

The flexible material is made of metallic or polymeric materials. Preferred metallic materials include, but are not limited to, stainless steel, carbon steel, spring steel, or nickel and titanium alloys. Preferred polymeric materials include, but are not limited to, polyester, thermoplastic polyamide, such as nylon, polyolefins, polyurethane, polystyrene, polyvinyl chloride, fluoropolymers, fluorothermoplastics, natural and synthetic rubbers, aramid fibers, such as KEVLAR® brand fiber, fiberglass, or composite reinforcements there of. The flexible material can include a further metallic or polymeric material.

As seen in FIGS. 1–7, there is a series of non-interlocking, motion-limiting, elements (14) attached to a flexible material (12). In preferred embodiments, the motion-limiting elements are in the form of solids attached to one side of the flexible material. It is understood that small portions of the motion-limiting solids can be present on an opposite side of the flexible material as means for attaching the solids to the flexible material and the solids continue to be considered as being attached to only one side of the flexible material (e.g., FIG. 2B). In other embodiments, the non-interlocking, motion-limiting, solids can be attached to both sides of the flexible material. In the most preferred embodiments, the solids are substantially similar in volume.

The non-interlocking, motion-limiting, solids can be made of a variety of materials such as metals, polymers, or combinations thereof. Preferred metallic and polymeric have high compression resistance. Consequently, the materials are robust, light in weight, inexpensive, and easy to shape or form. Examples of suitable metallic materials include, but are not limited to, aluminum, brass, zinc, magnesium, and alloys of these materials. Preferred metals are zinc-based alloys with differing amounts of aluminum and small amounts of copper and magnesium. These preferred alloys are available from Eastern Alloys, Inc., Maybrook, N.Y., under the tradename ZAMACK™ as part numbers ZA-8, ZA-12, and ZA-27. Suitable polymeric materials include, but are not limited to, engineered thermoplastics such as p-hydroxybenzoic acid-6 hydroxy-2-naphthoic acid copolymer, commonly referred to as liquid crystal polymer (LCP), glass filled nylon and polypropylene, acrylonitrile butadiene styrene (ABS), and thermosets such as epoxy. A preferred liquid crystal polymer is available from Polyplastics Co., Ltd., Osaka, Japan, under the tradename VECTRA® liquid crystal polymer. The solids are made by molding, casting, carving, and/or stamping. The preferred method is heat injection over-molding, also commonly referred to as insert molding.

The non-interlocking, motion-limiting, solids can be attached to the flexible material in various ways. Gluing, molding, press-fitting, snap-fitting, riveting, staking, forging, and mechanically fastening are suitable methods for attaching the solids to the flexible material. The preferred method of attaching the solids to the flexible materials is with heat injection over-molding, also commonly referred to as insert molding. In a preferred embodiment, the flexible material has a series of holes through the thickness of the material and running along the length of the material. The non-interlocking solids are molded on the flexible material in such a way that bottom portions of the solids fill the holes and wrap around all or part of the flexible material (FIG. 2B). The resulting construct has solids firmly attached to the flexible material.

Figure 2:
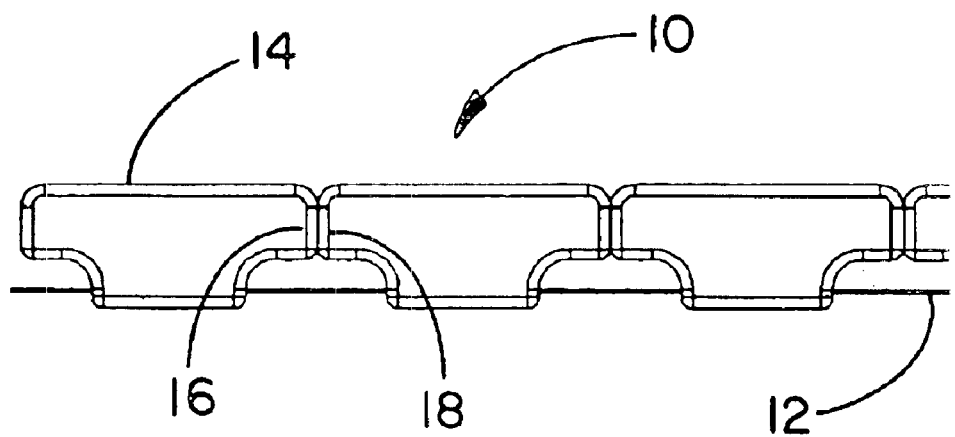
FIG. 2 illustrates a side view of the embodiment of FIG. 1.
Figure 2A:
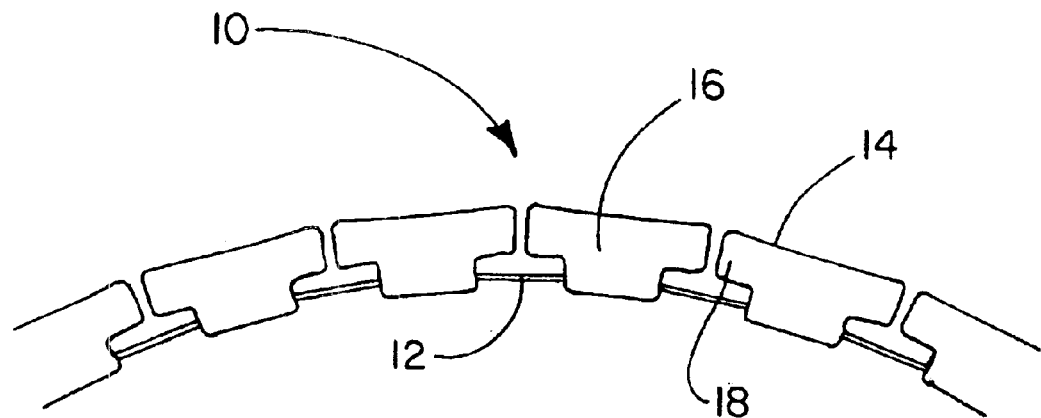
FIG. 2A illustrates an embodiment of the present invention in a curved configuration.
Figure 2B:
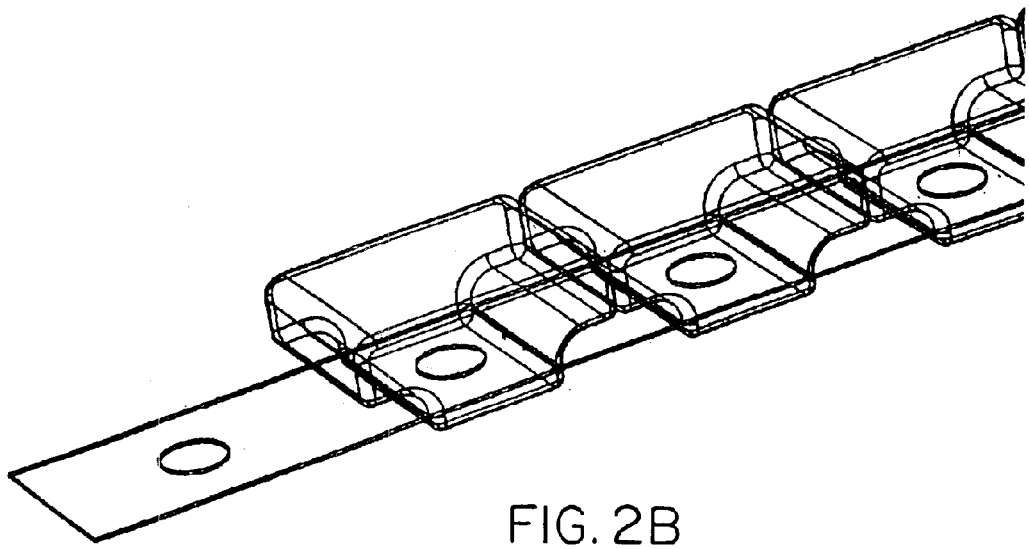
FIG. 2B illustrates an embodiment of the present invention having non-interlocking solids attached to a flexible material through holes in the flexible material.

The non-interlocking, motion-limiting, solids have portions that contact similarly located portions on adjacent solids when the flexible material is in a straightened configuration (e.g., FIG. 2, parts 16 and 18). When in contact, these portions serve as means for limiting the range of motion of the flexible material in one direction of movement. When the flexible material is operated in an opposite direction of movement, the portions separate and permit the flexible material to bend and assume a curved configuration (FIG. 2A).

Non-interlocking solids having preferred motion-limiting portions are illustrated in FIGS. 1–7. From a side view, the solids have particular profiles. In the preferred embodiment, the solids have a profile that is substantially similar in shape to a capital letter "T." Examples of other profiles for solids with motion-limiting portions include, but are not limited to, those illustrated in FIGS. 9–14.

In more preferred embodiments, the solids have means for maintaining linear alignment of the support member. The means include, but are not limited to, non-interlocking projections and concavities in mateable relationship (FIGS. 5–7, 15, and 17).

Figure 2C:
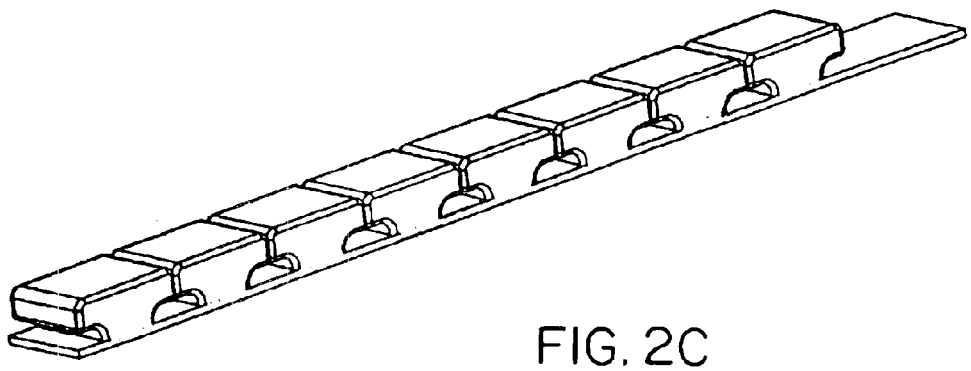
FIG. 2C illustrates an embodiment of the present invention wherein a flexible material and a series of non-interlocking, motion-limiting, solids are a single construct.

In another embodiment, the flexible material and the non-interlocking, motion-limiting, solids are formed as a single construct (FIG. 2C). Though metals, alloys, and composite materials can be used to make the construct, moldable polymeric materials are particularly suited for forming the flexible material and the non-interlocking, motion-limiting, solids as a single construct. In this embodiment, the present invention is in the form of a support element having a range of motion in one direction and essentially no range of motion in an opposite direction, wherein the support member comprises a flexible member combined with a plurality of non-interlocking solids in a single construct, wherein adjacent non-interlocking solids have portions that contact one another and restrict bending of said flexible member in one direction of movement, and wherein said portions of said non-interlocking solids separate from one another when said flexible member is activated in an opposite direction of movement, thereby permitting said flexible member to bend and assume a curved configuration.

In other embodiments of the present invention (FIGS. 8 and 8A), motion-limiting filaments (26) are used in place of, or in addition to, the above-discussed motion-limiting portions. In preferred embodiments, a plurality of solids (24) is attached to a flexible material (22) with spaces between adjacent solids. The preferred method of attaching the solids to the flexible materials is with heat injection over-molding, also commonly referred to as insert molding. In a preferred embodiment, the flexible material has a series of holes through the thickness of the material and running along the length of the material. The solids are molded on the flexible material in such a way that bottom portions of the solids fill the holes and wrap around all or part of the flexible material. The resulting construct has solids firmly attached to the flexible material.

At least one high tensile strength (e.g., 400 psi, (28.12278 Kg/cm$^2$)) and low stretch (e.g., less than about 3.6 percent elongation at breakage) filament is attached to the solids as a means of limiting the range of motion of the flexible material when the invention is operated in one direction of movement. The at least one filament does not restrict motion of the flexible material when the invention is operated in an opposite direction of movement. In the most preferred embodiment, the filament is attached to the solids when the flexible material is in a straightened, or flattened, configuration. When viewed from one side, the filament (26) and flexible material (22) appear substantially in parallel (FIG. 8A).

The filament material is made of metallic or polymeric materials. Preferred metallic materials include, but are not limited to, stainless steel and alloys there of, or nickel and titanium alloys. Preferred polymeric materials include, but are not limited to, aramid fibers available from E. I. du Pont de Nemours and Company, Wilmington, Del., under the tradename KEVLAR® brand fiber, poly(p-phenylenebenzobisoxazole) fiber available from Toyobo Co. Ltd., Osaka, Japan, under the tradename ZYLON® fiber, and an aramid fiber available from Teijin, Osaka, Japan under the tradename TECHNORA™ aramid fiber, liquid crystal polymers, polyester, nylon, and heat stabilized (HS) polyethylene. The filament material can be coated with lubricant or impregnated with resin to increase strength and reduce abrasion. Furthermore, the filament material can be in the form of a straight, twisted or woven yarn, woven fabric, fiber, fine wire, or composite reinforced thin film.

The at least one filament is attached to the solids by gluing, molding, or heat staking. The preferred method is insert molding also commonly referred to as over-molding.

Figure 15:
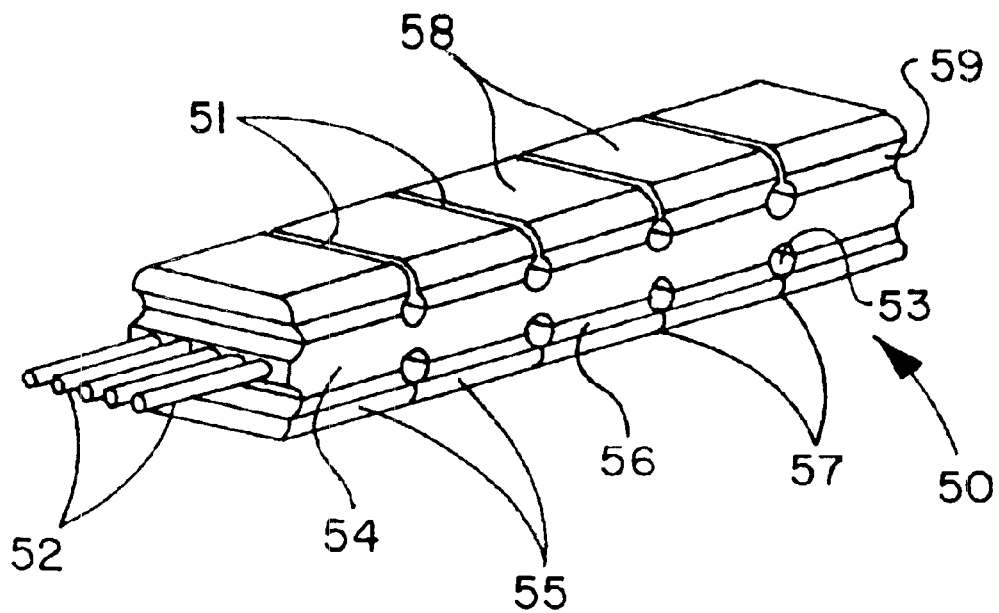
FIG. 15 illustrates a perspective view of a support member of the present invention.
Figure 16:
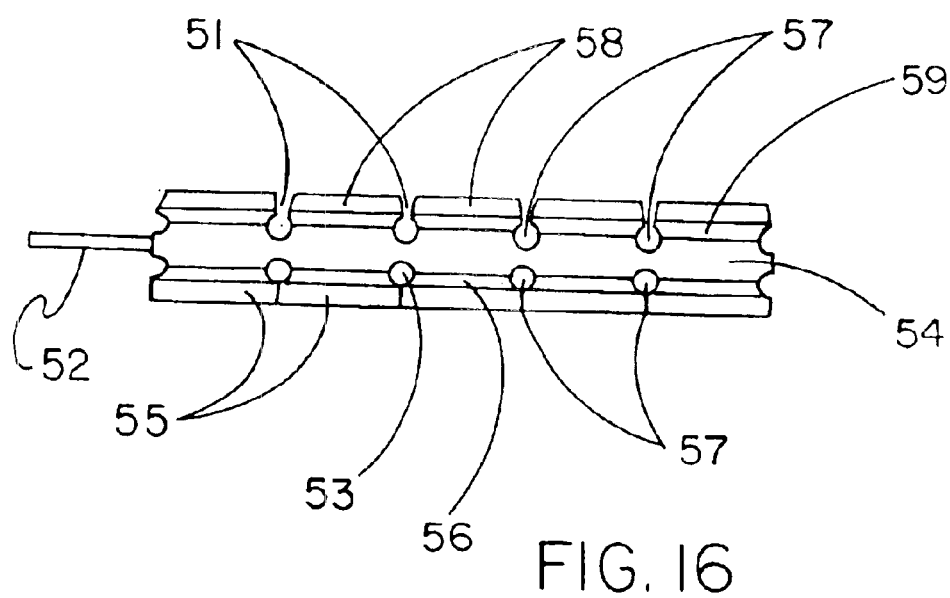
FIG. 16 illustrates a side view of the embodiment of FIG. 15.

In another embodiment, the flexible material is in the form of at least one filament or fiber. In preferred forms of this embodiment, several filaments or fibers are used together in a substantially parallel array (FIGS. 15 and 16, part 52). In embodiments utilizing such an array, a base layer of polymeric material (54) encloses and maintains the individual filaments of the array in parallel relationship. In these embodiments, a first series of non-interlocking, motion-limiting, solids (55) are formed together as a first strip of material (56) and attached to one side of the base layer. The solids are separated from one another by a slit (57), or similarly narrow cutout, formed between adjacent solids. The slit extends from an external surface of the first strip through the body of the strip to a location near the bottom of the first strip. A second series of non-interlocking solids (58) are optionally formed on the opposite side of the base layer, preferably as a second strip of material (59). The additional non-interlocking solids can serve to mechanically balance the non-interlocking, motion-limiting, solids. The additional non-interlocking solids can also limit the motion and bend radius of the support member, but to a lesser degree than the first series of non-interlocking solids. The second series of non-interlocking solids are separated from one another by a notch, wedge, or similar cutout, formed between adjacent solids. In either layer, the slits, wedges, or notches are preferably provided with a cutout (53) at one end. The cutouts prevent the slits, wedges, or notches from extending in length as the support member (50) is repeatedly flexed. The cutouts also provide additional flexibility to the support member. In this embodiment, the present invention is in the form of a support member having a range of motion in one direction and essentially no range of motion in an opposite direction, wherein said support member comprises a length of a first flexible polymeric material comprising a plurality of non-interlocking solids, wherein adjacent non-interlocking solids have portions that contact one another and restrict bending of said flexible member in one direction of movement, and wherein said portions of said non-interlocking solids separate from one another when said flexible member is activated in an opposite direction of movement, thereby permitting said flexible member to bend and assume a curved configuration, and at least one layer of material having at least one reinforcing element embedded therein attached to one side of said first flexible material. In a further embodiment, the invention further comprises a length of a second flexible material comprising a plurality of non-interlocking solids attached to an opposite side of said at least one layer of material.

Figure 17:
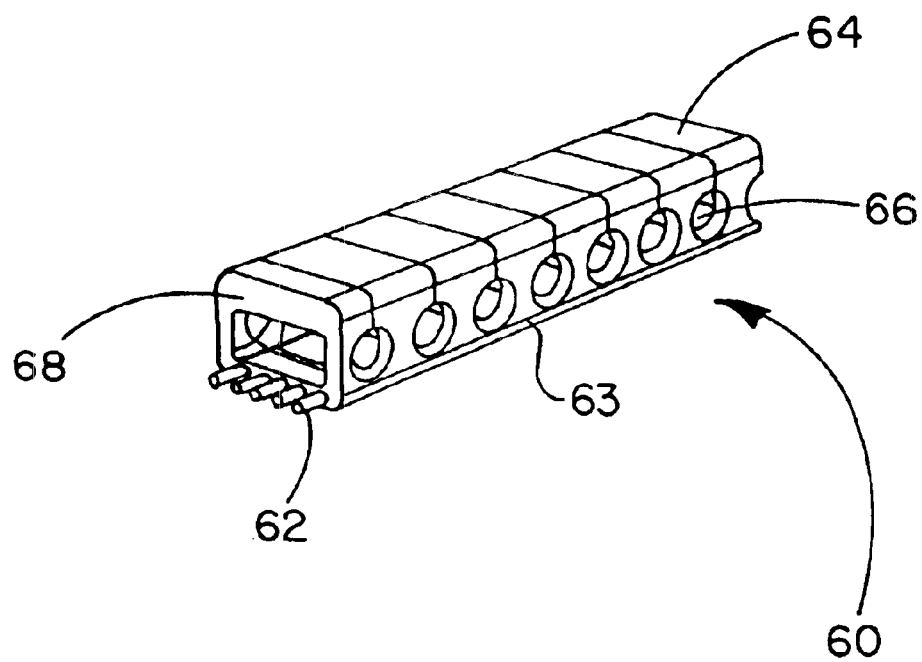
FIG. 17 illustrates a perspective view of a support member of the present invention.

In yet another embodiment, a series of non-interlocking, motion-limiting, solids are constructed together as a single continuous strip of material (FIG. 17, part 68, or FIG. 19, part 78) with a length of flexible material attached to the strip. The length of flexible material can be in the form of a strip (FIG. 19, part 72) or in the form of one or more filaments (FIG. 17, part 62). Narrow slits (64 or 74) are provided to separate adjacent solids. Cutouts (66 or 76) are also provided at one end of each slit to prevent extension of the slits during repeated flexing and to increase the overall flexibility of the support member (60 or 70). In this embodiment, the present invention is in the form of a support member having a range of motion in one direction and essentially no range of motion in an opposite direction wherein the support member comprises a continuous strip of material comprising a series of non-interlocking, motion-limiting, solids, wherein adjacent non-interlocking solids have portions that contact one another and restrict bending of said flexible member in one direction of movement, and wherein said portions of said non-interlocking solids separate from one another when said flexible member is activated in an opposite direction of movement, thereby permitting said continuous strip to bend and assume a curved configuration, and at least one reinforcing element embedded in said continuous strip.

An assembly of conduits, conductors, channels and/or other electro-mechanical elements employing one or more of the above-discussed support members can be constructed in a variety of ways. Conductors are substances or media that permit electricity, light, heat, or other forms of energy to pass through them. Conduits are pathways for conveying energy, fluids, or gases. Channels are hollow tubes or ducts for transferring gases or liquids. Alternatively, channels can house support members, conductors, and/or conduits.

In one embodiment, an assembly is constructed with at least one conductor or conduit disposed substantially in parallel with at least one support member and enclosed, or surrounded, in a polymeric jacket or envelope. The preferred method of forming the jacket or envelope is by laminating two sheets of a thermoplastic material together with an appropriate adhesive. Preferred jacket materials include, but are not limited to fluoropolymers, such as polytetrafluoroethylene, porous polytetrafluoroethylene, perfluoroaxoxy (PFA), fluorinated ethylene polymer (FEP), ethylene-tetrafluoroethylene copolymer (ETFE) available from from E. I. du Pont de Nemours and Company, Wilmington, Del., under the tradename TEFZEL® ETFE Fluoropolymer Resin, and polyvinydene fluoride (PVDF), thermoplastics, such as polyethylene, polypropylene, polystyrene, acrylonitrile butadiene styrene (ABS), polyetheretherketone (PEEK), thermoplastic polyamide, such as NYLON®, polyurethane, polyvinylchloride (PVC), fluorothermoplastics such as DYNEON™ THV™ fluorothermoplastic available from Dyneon, Oakdale, Minn., thermoplastic elastomers such as HYTREL® polyester thermoplastic elastomer available from E. I. du Pont de Nemours and Company, Wilmington, Del., and thermoplastic rubbers such as SANTOPRENE® thermoplastic rubbers available from Advanced Elastomer Systems, Akron, Ohio, and composites there of.

Figure 21:
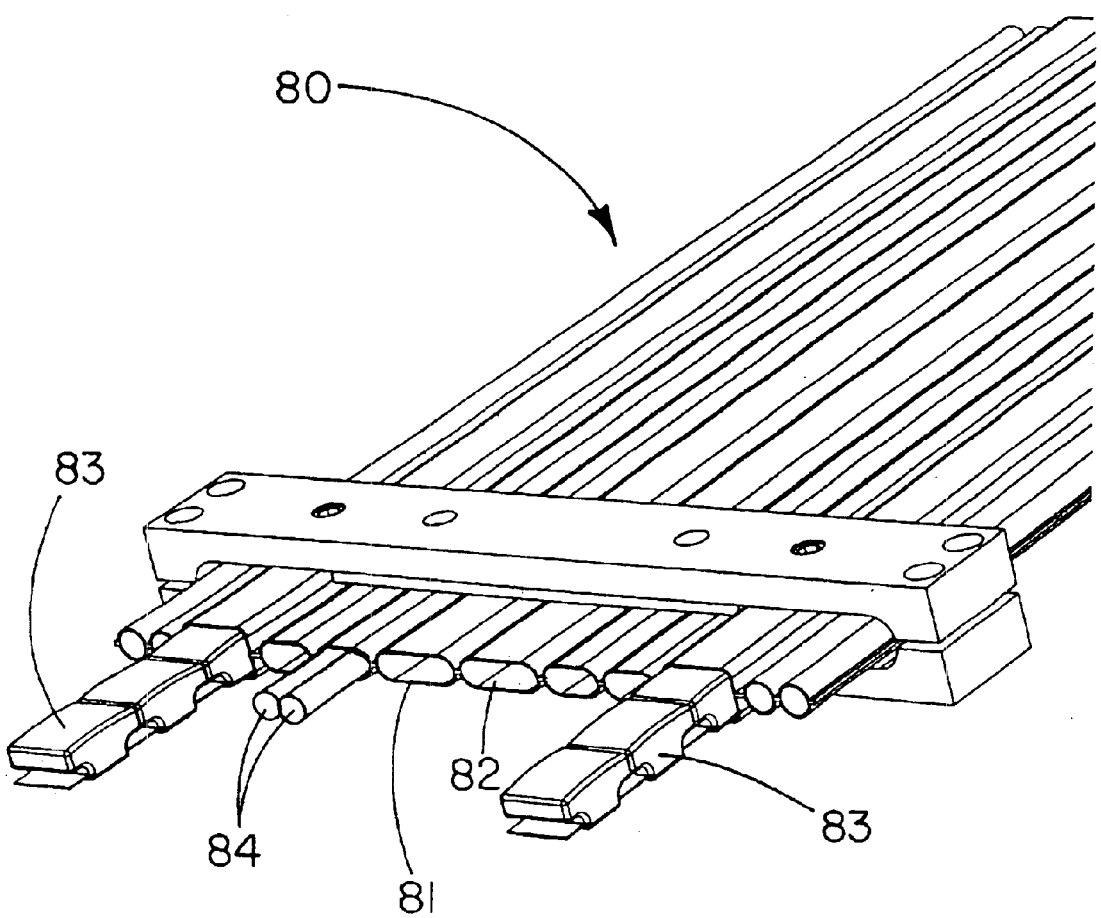
FIG. 21 illustrates a perspective view of the present invention having two support members in combination with a plurality of channels.

In another embodiment (FIG. 21, part 80), at least one channel is formed by the jacket component (81) during the lamination process. The channel is made by enclosing, or surrounding, at least one removable form in a suitable jacket material. Once the jacket is made, the form is removed to leave a channel in its place (82). A variety of devices can be placed inside the channel. In preferred embodiments, multiple channels are formed and a support member (83), conductor, conduit, and/or other means of transmitting gas, fluid, or energy (84) are placed inside each channel.

EXAMPLE 1

This example describes the construction of a support member of the present invention as illustrated in FIGS. 1–2.

A length of flexible material in the form of 301 High Yield Stainless Steel, 0.25 inches wide and 0.005 inches thick was obtained from Belt Technologies, Inc., Agawam, Mass. A series of holes 0.093 inches in diameter were stamped in the stainless steel. The holes were spaced 0.385 inches apart. The stainless steel was then placed in an insert mold in preparation for attaching of a plurality of non-interlocking, motion-limiting, solids to the stainless steel. The insert mold was provided with a form for the solids having an overall shape and profile as illustrated in FIGS. 1 and 2, respectively. An over-molding technique was used to simultaneously form and attach the solids to the stainless steel. The stainless steel was maintained in a curved configuration in the mold to provide space between each individual solid as the solids were formed and attached to the stainless steel.

A liquid crystal polymer available from Polyplastics Co., Ltd., Osaka, Japan, under the tradename VECTRA® liquid crystal polymer was used to form the non-interlocking, motion-limiting, solids. Individual solids were formed over the perforated portions of the flexible stainless steel material in a sequential manner by an over-molding technique. In the over-molding technique, a perforation in the stainless steel was aligned with a mold defining a solid and liquid crystal polymer introduced into the mold. The solids each had a length of 0.385 inches, a width of 0.28 inches, and a height of 0.165 inches. The liquid crystal polymer flowed into the mold and around the flexible stainless steel material to form an individual solid. As the liquid crystal polymer flowed and cured around the stainless steel material, the solid became attached to the stainless steel. Once an individual solid was formed on the stainless steel material, the stainless steel was advanced through the insert mold to the next perforation and the over-molding process repeated to form another solid in the series. When the last solid was formed and attached to the flexible stainless steel material, a completed support member of the present invention was removed from the insert mold.

EXAMPLE 2

Figure 3:
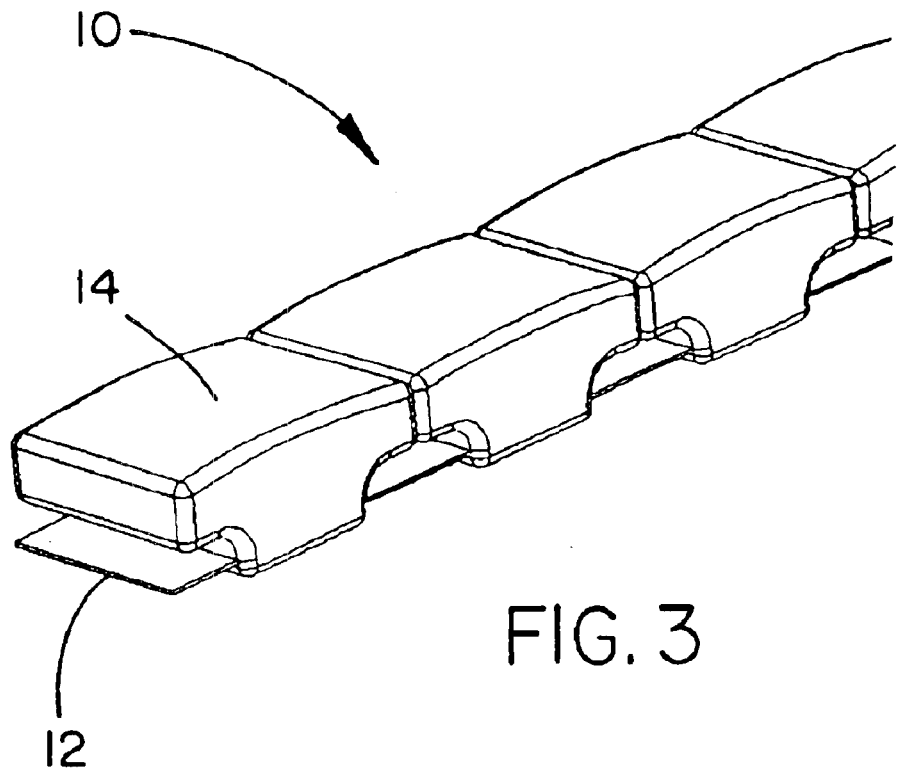
FIG. 3 illustrates a perspective view of a support member of the present invention.
Figure 3A:
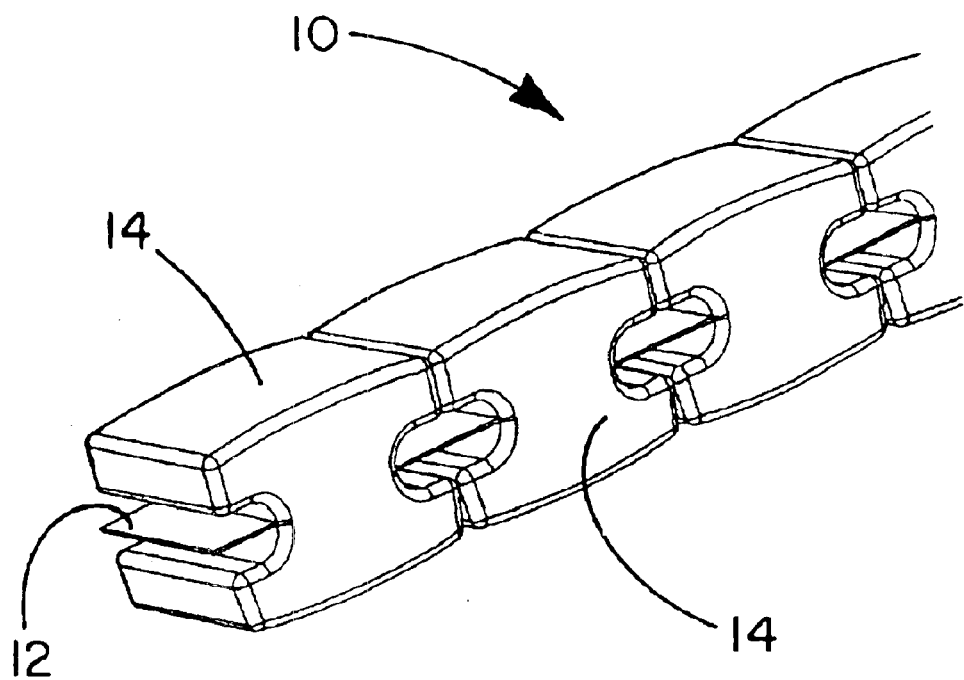
FIG. 3A illustrates a perspective view of a support member of the present invention having non-interlocking, motion-limiting, solids on both sides of a flexible material.
Figure 4:
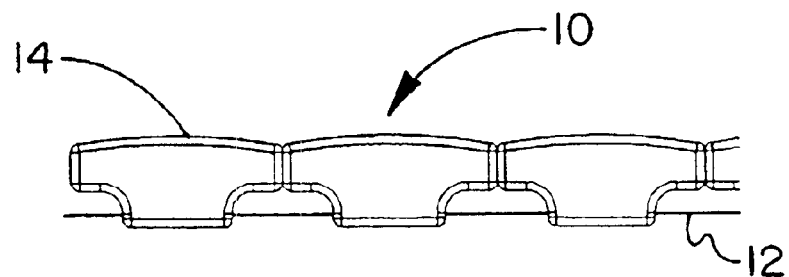
FIG. 4 illustrates a side view of the embodiment of FIG. 3.

This example describes the construction of a support member of the present invention as illustrated in FIGS. 3–4.

The materials and methods of this example are the same as those described in Example 1 except for the overall shape and profile of the non-interlocking, motion-limiting, solids. The overall shape and profile of the solids formed in this example are illustrated in FIGS. 3 and 4, respectively.

EXAMPLE 3

Figure 5:
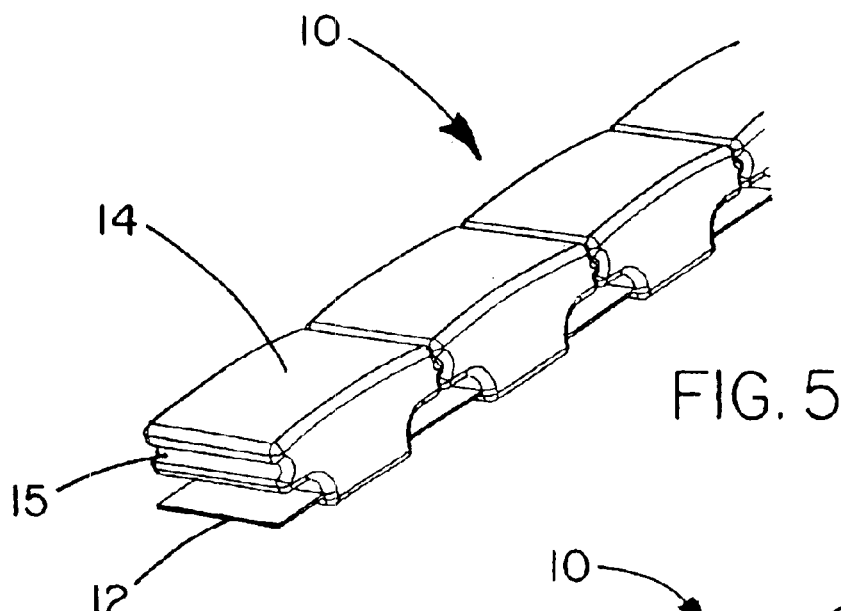
FIG. 5 illustrates a perspective view of a support member of the present invention.
Figure 6:
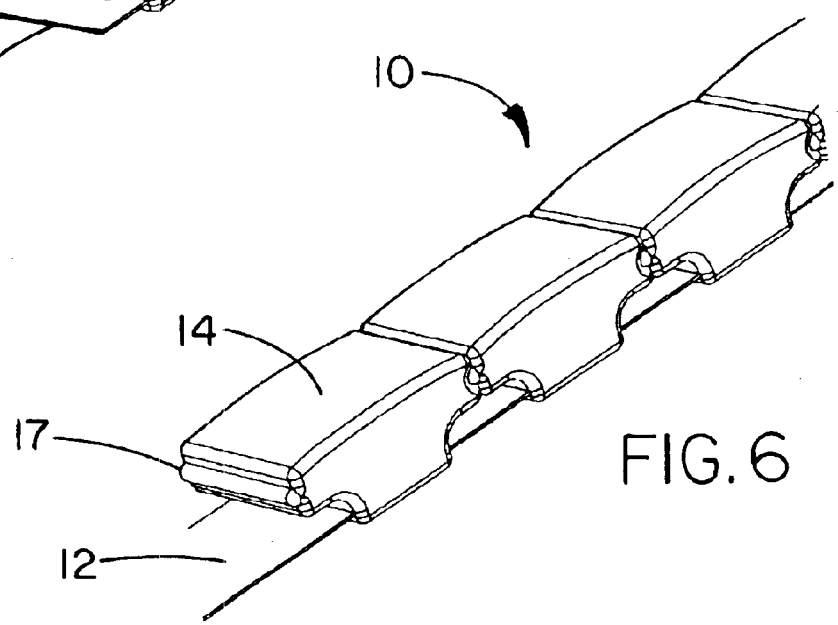
FIG. 6 illustrates a perspective view of a support member of the present invention from an angle opposite the view of FIG. 5.
Figure 7:
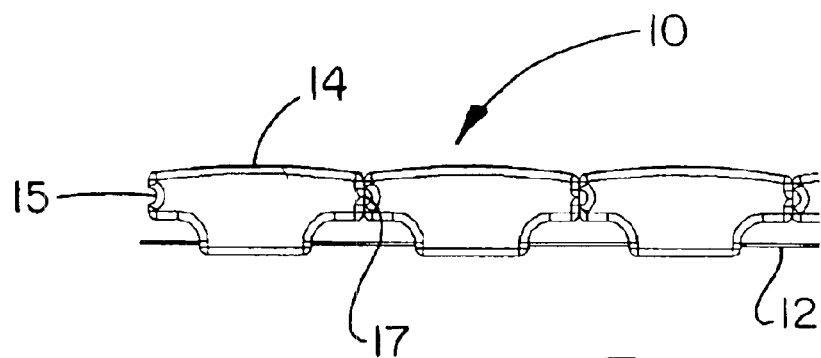
FIG. 7 illustrates a side view of the embodiment of FIG. 5 or FIG. 6.

This example describes the construction of a support member of the present invention as illustrated in FIGS. 5–7.

The materials and methods of this example are the same as those described in Example 1 except for the shape and profile of the non-interlocking, motion-limiting, solids. The overall shape of the solids formed in this example is illustrated in FIGS. 5–6. The profile of the solids is illustrated in FIG. 7. The solids of this example have non-interlocking projections and concavities in mateable relationship. These features serve as means for maintaining linear alignment of the support member.

EXAMPLE 4

Figure 8:
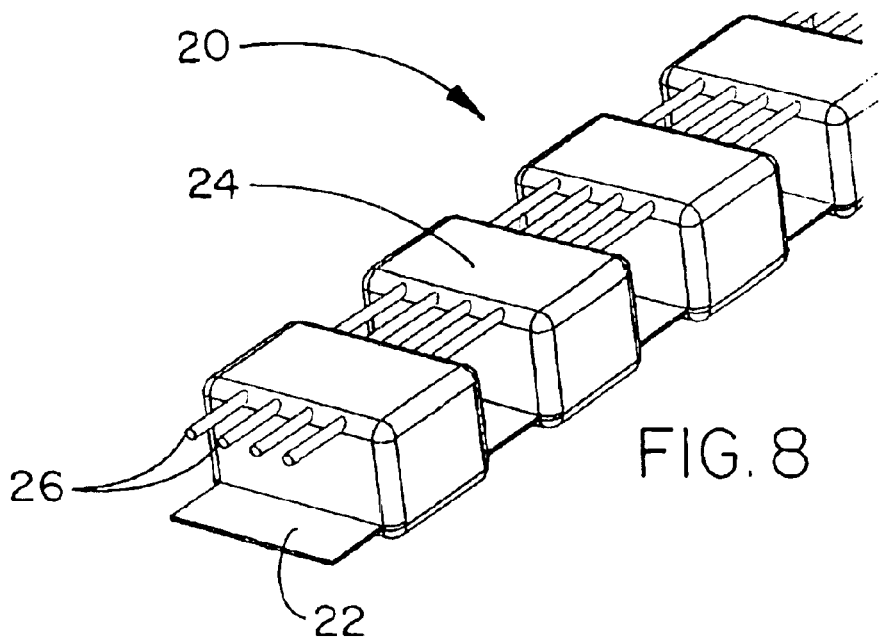
FIG. 8 illustrates a perspective view of a support member of the present invention.
Figure 8A:
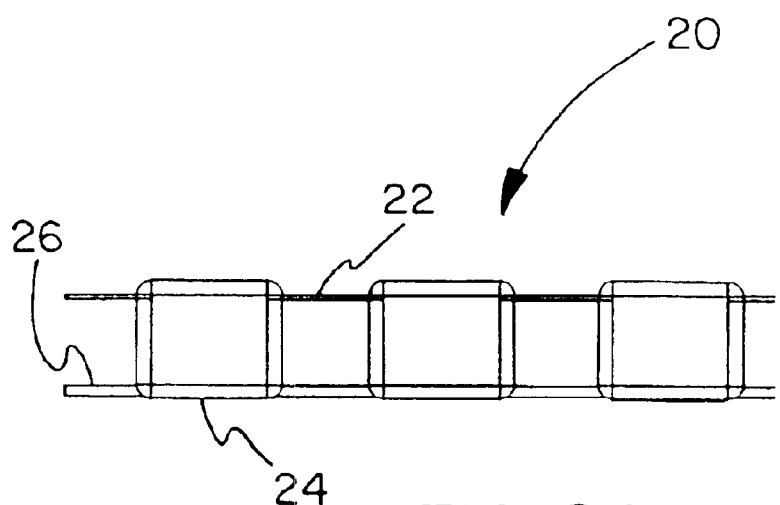
FIG. 8A illustrates a side view of the embodiment of FIG. 8.
Figure 9:
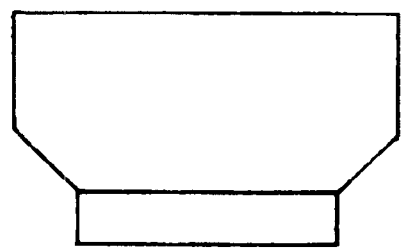
FIGS. 9–14 each illustrate a profile of a non-interlocking, motion-limiting, solid of the present invention.
Figure 10:
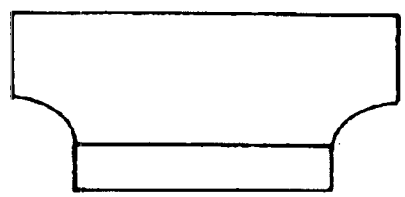
Figure 11:
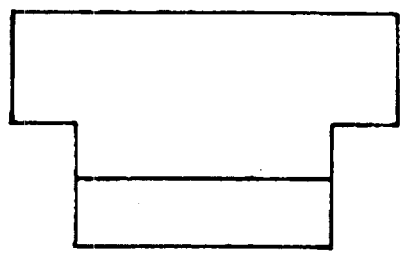
Figure 12:
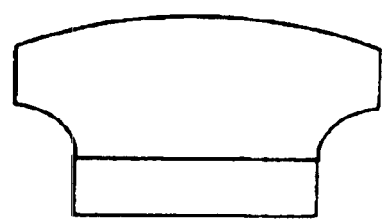
Figure 13:
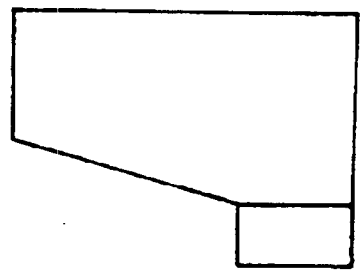
Figure 14:
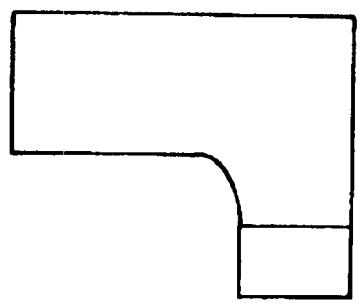

This example describes the construction of a support member of the present invention as illustrated in FIGS. 8 and 8A. This embodiment has three main components, a length of flexible material, a plurality of non-interlocking solids, and a series of filaments attached to the solids that restrict motion of the flexible material in one direction, but not in an opposite direction.

A length of flexible material in the form of 301 High Yield Stainless Steel, 0.25 inches wide and 0.005 inches thick was obtained from Belt Technologies, Inc., Agawam, Mass. A series of holes 0.093 inches in diameter were stamped in the stainless steel. The holes were spaced 0.32 inches apart. The stainless steel was then placed in an insert mold in preparation for attaching of a plurality of non-interlocking solids to the stainless steel and a series of filaments to the solids.

Once the length of flexible stainless steel material was placed in the insert mold, four aramid filaments, available from E. I. du Pont de Nemours and Company, Wilmington, Del., under the tradename KEVLAR® brand fiber, were suspended 0.13 inches above the stainless steel. The filaments were aligned substantially in parallel with the axis of the stainless steel. Neighboring filaments were spaced approximately 0.05 inches apart. The filaments were held under 5.0 pounds of tension throughout the construction process.

The insert mold was provided with a form for the non-interlocking solids having an overall shape and profile as illustrated in FIGS. 8 and 8A, respectively. An over-molding technique was used to simultaneously form and attach individual solids to the stainless steel. The filaments were also attached to the solids in the over-molding process.

A liquid crystal polymer available from Polyplastics Co., Ltd., Osaka, Japan, under the tradename VECTRA® liquid crystal polymer was used to form the non-interlocking solids. In the over-molding technique, a perforation in the stainless steel was aligned with a mold defining a solid and liquid crystal polymer introduced into the mold. The liquid crystal polymer flowed into the mold and around the flexible stainless steel material to form an individual solid. As the liquid crystal polymer cured around the stainless steel, the solid became attached to the stainless steel. The liquid crystal polymer also flowed around the filaments. As the liquid crystal polymer cured around the filaments, the filaments became attached to the solids.

Once an individual solid and filament array was formed and attached to the stainless steel, the stainless steel material was advanced through the insert mold to the next perforation and the over-molding process repeated to form another solid and filament array in the series. When the last solid and filament array was formed and attached to the flexible stainless steel material, a completed support member of the present invention was removed from the insert mold.

EXAMPLE 5

This example illustrates the construction of a support member of the present invention as illustrated in FIGS. 15 and 16. This embodiment has three main components. The first component is a length of a first flexible polymeric material comprising a plurality of non-interlocking, motion-limiting, solids. The second component comprises at least one layer of a second flexible polymeric material having at least one reinforcing element embedded in the material that is attached to the first flexible polymeric material. The third component is another layer of a third flexible polymeric material comprising a plurality of non-interlocking, motion-limiting, solids attached to the second component.

The first and third layers of flexible polymeric material (FIG. 15, parts 59 and 56, respectively) are made from a high modulus polyamid extrusion material available from Creanova, Inc., Frankfurt, Germany under the tradename VESTAMID® high performance polymer as part number L-cf15sw. This material is hard enough to resist compression and cold flow extrusion. The material also has good impact resistance.

The second, or middle, layer (FIG. 15, part 54) is made from material that is softer than the material used for layers one and three. The material of the second layer also has a lower modulus than the material of the first and third layers. This material is also available from Creanova, Inc., Frankfurt, Germany under the trade under the tradename VESTAMID® high performance polymer as part number L2121.

The second layer is reinforced with a high tensile strength fiber embedded in the polymeric material (FIG. 15, part 52). The fiber is centrally located in the material and runs longitudinally along the length of the material. The preferred fiber is an aramid fiber available from E. I. du Pont de Nemours and Company, Wilmington, Del. under the tradename KEVLAR® brand fiber, catalog reference Kevlar 49,1500 denier. The fiber has 1.1 twists per inch. The fiber is encapsulated in the polymeric material by extruding the material over and around the fiber.

The three layered support member is formed by simultaneously extruding all three component layers together in a single process. The support member is extruded in a curved configuration to allow for notches and slits to be formed in the first and third layers, respectively (FIG. 15B).

Transverse notches (FIG. 15, part 51), or wedges, are cut into the material of layer three with a knife or wedge-shaped tool, while the material is still soft from the extrusion process. The notches penetrate through the material of layer three and stop at the material of layer two.

Transverse slits (FIG. 15, part 57) are cut into the material of layer one with a knife, or other suitable tool, while the material is still soft from the extrusion process. No gaps are seen between the individual non-interlocking, motion-limiting, solids when the support member is in a straightened configuration.

Once the three-layered support member is formed, stress-relieving holes (FIG. 15, part 57) are drilled or cut into the sides of the support member at the ends of each notch and slit to prevent propagation of stress-cracks into the second layer material. The result is a support member of the present invention having a range of motion in one direction and essentially no range of motion in an opposite direction.

EXAMPLE 6

Figure 15A:
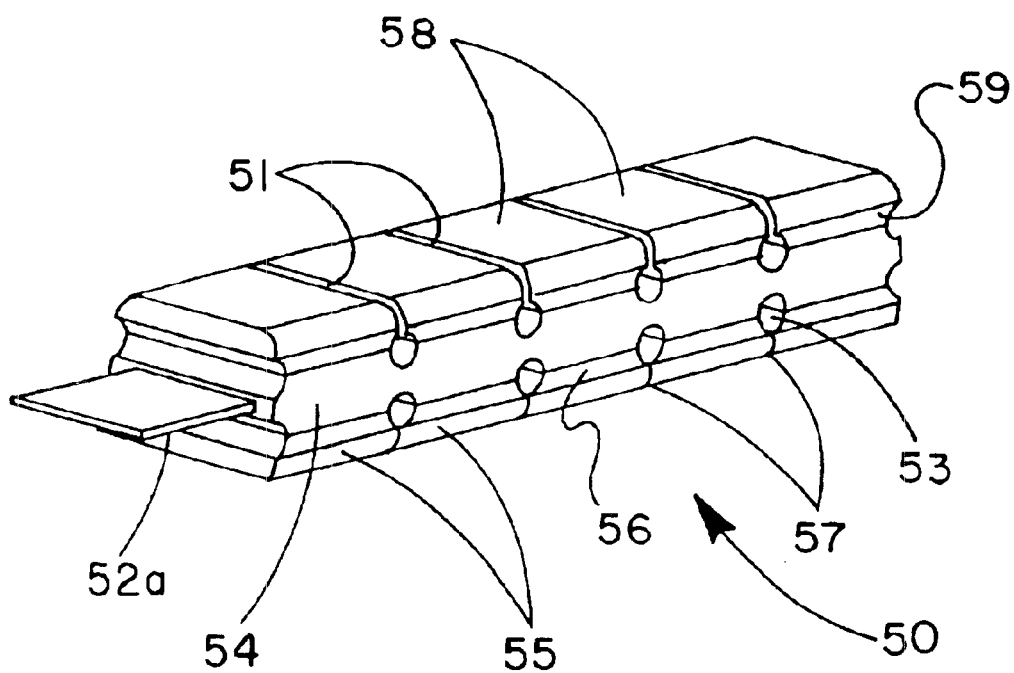
FIG. 15A illustrates a perspective view of a support member of the present invention.
Figure 15B:
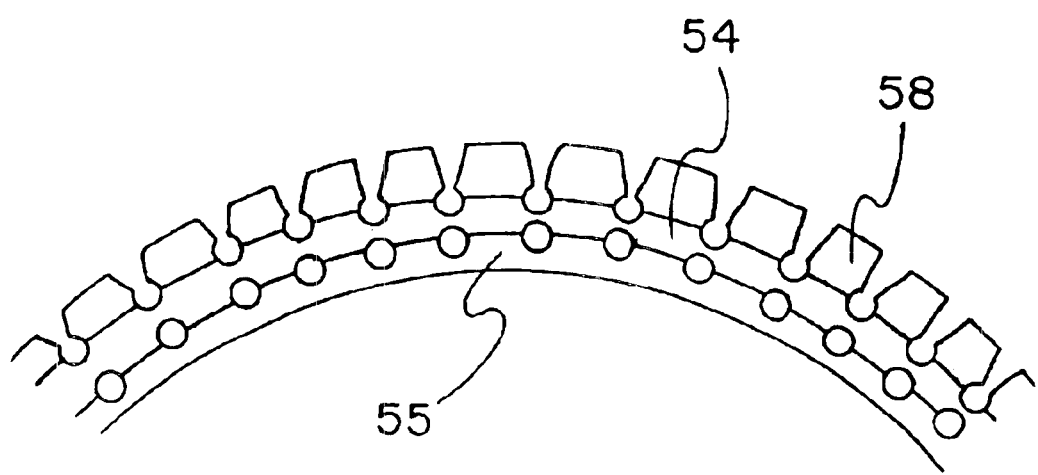
FIG. 15B illustrates a side view of the present invention.
Figure 16A:
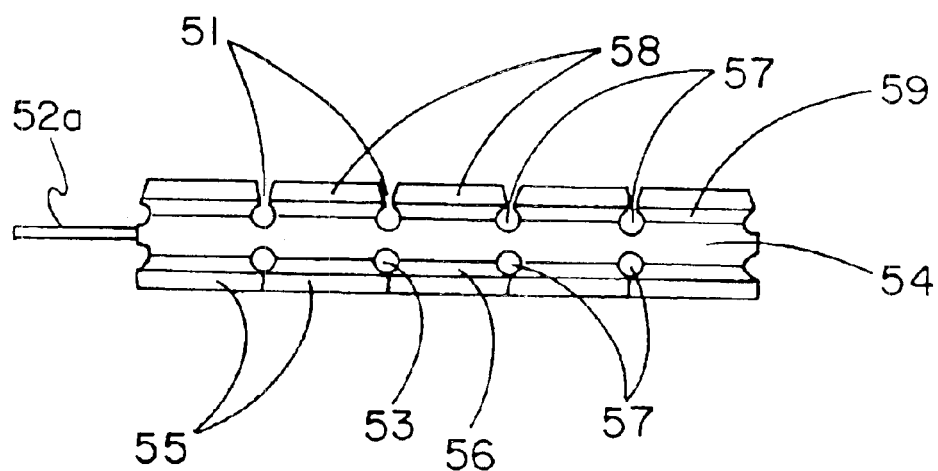
FIG. 16A illustrates a side view of the embodiment of FIG. 15A.

This example illustrates the construction of a support member of the present invention as illustrated in FIGS. 15A and 16A.

This embodiment has three main components. The first component is a length of a first flexible polymeric material comprising a plurality of non-interlocking, motion-limiting, solids. The second component comprises at least one layer of a second flexible polymeric material having at least one reinforcing element embedded in the material attached to the first flexible polymeric material. The third component is another layer of a third flexible polymeric material comprising a plurality of non-interlocking, motion-limiting, solids attached to the second component.

The first and third layers of this embodiment are the same as those described in Example 5, above.

The second layer is similar to the second layer of Example 5 except the reinforcing element is a metallic strip (FIG. 15A, part 52a). The material for the metallic strip is in the form of 301 High Yield Stainless Steel, 0.25 inches wide and 0.005 inches thick and is obtained from Belt Technologies, Inc., Agawam, Mass. A series of holes 0.093 inches in diameter are stamped in the stainless steel. The holes are spaced 0.385 inches apart.

The processes of forming the different layers are the same as Example 5.

The result is a support member of the present invention having a range of motion in one direction and essentially no range of motion in an opposite direction.

EXAMPLE 7

Figure 18:
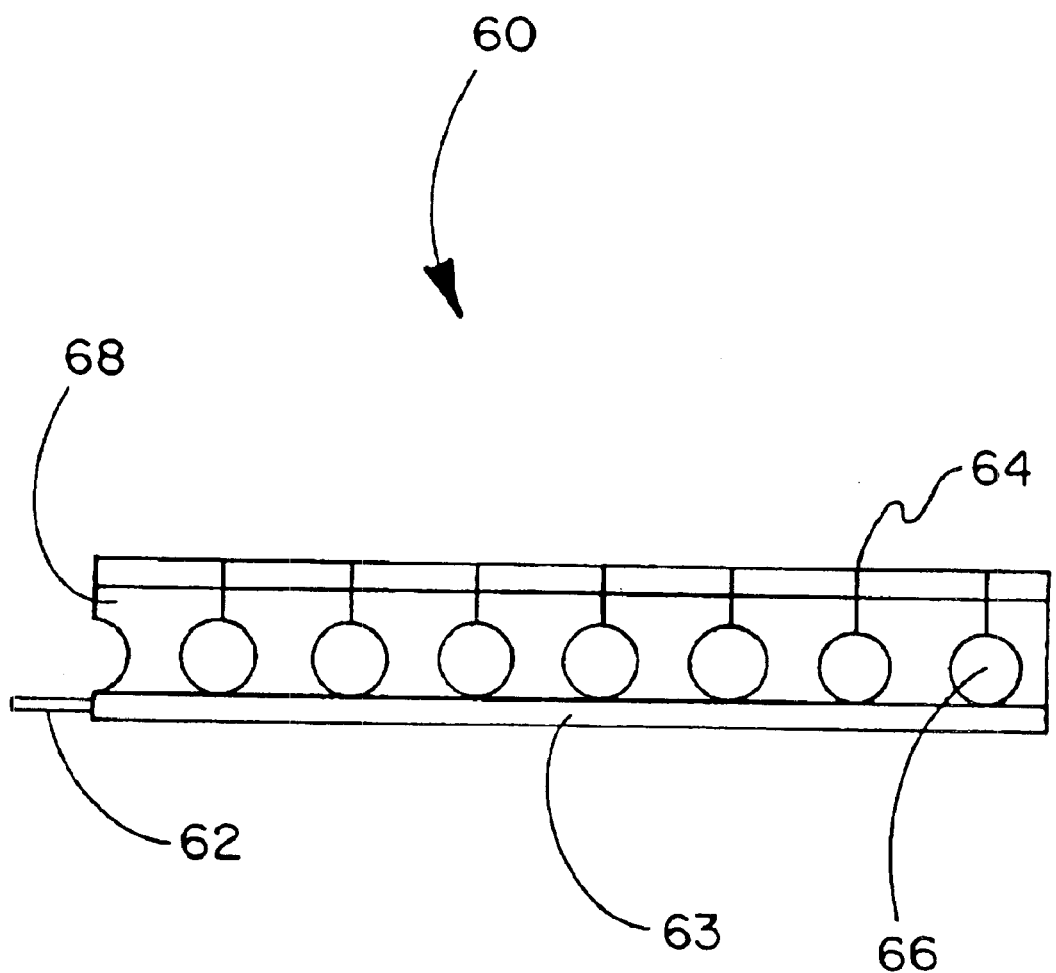
FIG. 18 illustrates a side view of the embodiment of FIG. 17.

This example illustrates the construction of a support member of the present invention as illustrated in FIGS. 17 and 18.

This embodiment has two main components. The first component is a length of a first flexible polymeric material comprising a plurality of non-interlocking, motion-limiting, solids. The second component comprises at least one layer of a second flexible polymeric material having at least one reinforcing element embedded in the material attached to the first flexible polymeric material.

The first layer of flexible polymeric material (FIG. 17, part 68) is made from a high modulus polyamid extrusion material available from Creanova, Inc., Frankfurt, Germany under the tradename VESTAMID® high performance polymer as part number L-cf15sw. This material is hard enough to resist compression and cold flow extrusion. The material also has good impact resistance.

The second layer (FIG. 17, part 63) is made from material that is softer than the material used for the first layer. The material of the second layer also has a lower modulus than the material of the first layer. This material is also available from Creanova, Inc., Frankfurt, Germany under the trade under the tradename VESTAMID® high performance polymer as part number L2121.

The second layer is reinforced with a high tensile strength fiber embedded in the polymeric material (FIG. 17, part 62). The fiber is centrally located in the material and runs longitudinally along the length of the material. The preferred fiber is a aramid fiber available from E. I. du Pont de Nemours and Company, Wilmington, Del. under the tradename KEVLAR® brand fiber, catalog reference Kevlar 49, 1500 denier. The fiber has 1.1 twists per inch. The fiber is encapsulated in the polymeric material by extruding the material over and around the fiber.

Figure 17A:
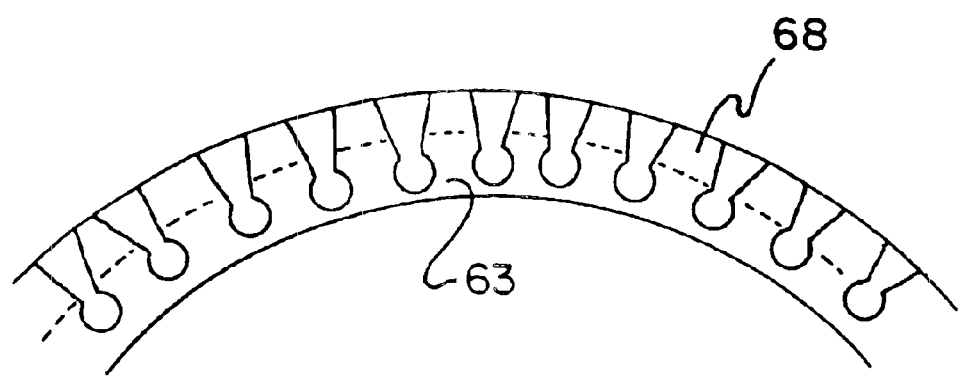
FIG. 17A illustrates a side view of the present invention.

The two layered support member is formed by simultaneously extruding both component layers together in a single process. The support member is extruded in a curved configuration to allow for notches and slits to be formed in the first layer (FIG. 17A).

Transverse slits (FIG. 17, part 64) are cut into the material of layer one with a knife, or other suitable tool, while the material is still soft from the extrusion process. No gaps are seen between the individual non-interlocking, motion-limiting, solids when the support member is in a straightened configuration.

Once the two-layered support member is formed, stress-relieving holes (FIG. 17, part 66) are drilled or cut into the sides of the support member at the end of each slit to prevent propagation of stress-cracks into the second layer material. The result is a support member of the present invention having a range of motion in one direction and essentially no range of motion in an opposite direction.

EXAMPLE 8

Figure 19:
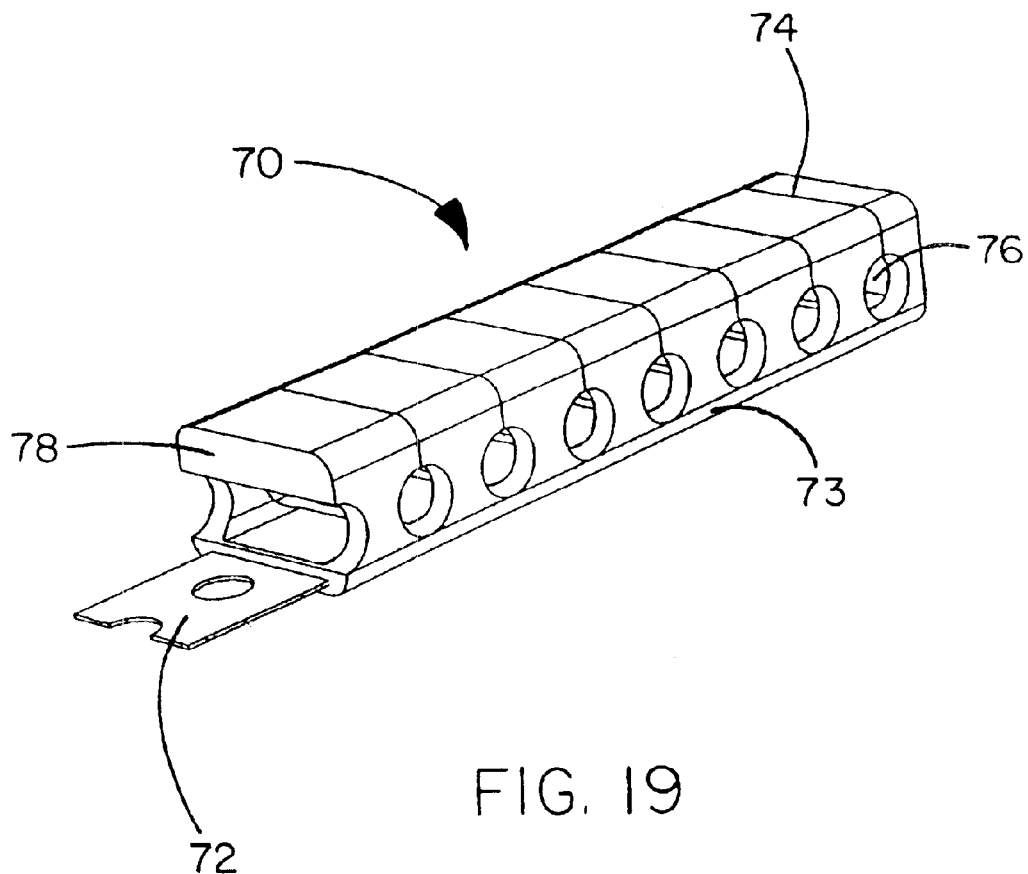
FIG. 19 illustrates a perspective view of a support member of the present invention.
Figure 20:
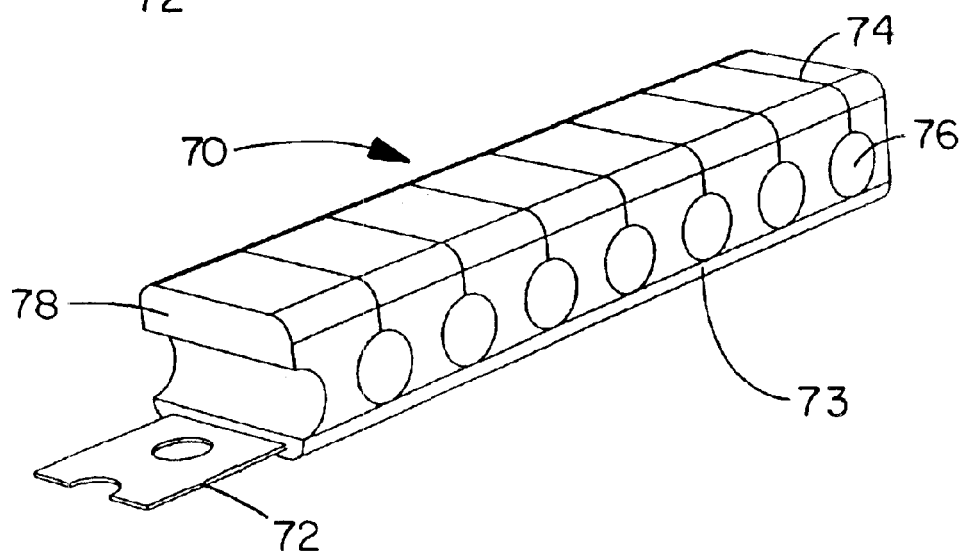
FIG. 20 illustrates a perspective view of a support member of the present invention.

This example illustrates the construction of a support member of the present invention as illustrated in FIGS. 19 and 20.

This embodiment has two main components. The first component is a length of a first flexible polymeric material comprising a plurality of non-interlocking, motion-limiting, solids. The second component comprises at least one layer of a second flexible polymeric material having at least one reinforcing element embedded in the material attached to the first flexible polymeric material.

The first layer of flexible polymeric material (FIG. 19, part 78) is made from a high modulus polyamid extrusion material available from Creanova, Inc., Frankfurt, Germany under the tradename VESTAMID® high performance polymer as part number L-cf15sw. This material is hard enough to resist compression and cold flow extrusion. The material also has good impact resistance.

The second layer (FIG. 19, part 73) is made from material that is softer than the material used for the first layer. The material of the second layer also has a lower modulus than the material of the first layer. This material is also available from Creanova, Inc., Frankfurt, Germany under the trade under the tradename VESTAMID® high performance polymer as part number L2121.

The second layer is similar to the second layer of Example 7 except the reinforcing element is a metallic strip (FIG. 19, part 72). The material for the metallic strip is in the form of 301 High Yield Stainless Steel, 0.25 inches wide and 0.005 inches thick and is obtained from Belt Technologies, Inc., Agawam, Mass. A series of holes 0.093 inches in diameter are stamped in the stainless steel. The holes are spaced 0.385 inches apart.

The processes of forming the different layers are the same as Example 7.

The result is a support member of the present invention having a range of motion in one direction and essentially no range of motion in an opposite direction.

The two layered support member is formed by simultaneously extruding both component layers together in a single process. The support member is extruded in a curved configuration to allow for notches and slits to be formed in the first and third layers, respectively.

Transverse slits (FIG. 19, part 74) are cut into the material of layer one with a knife, or other suitable tool, while the material is still soft from the extrusion process. No gaps are seen between the individual non-interlocking, motion-limiting, solids when the support member is in a straightened configuration.

Once the two-layered support member is formed, stress-relieving holes (FIG. 19, part 76) are drilled or cut into the sides of the support member at the end of each slit to prevent propagation of stress-cracks into the second layer material. The result is a support member of the present invention having a range of motion in one direction and essentially no range of motion in an opposite direction.

We claim:

1. A support member having a range of motion in one direction and essentially no range of motion in an opposite direction, said support member comprising:
   a length of flexible material; and
   a plurality of adjacent non-interlocking solids attached to said flexible material, wherein said adjacent non-interlocking solids have portions that contact one another and restrict bending of said flexible material in one direction of movement, and wherein said portions of said adjacent non-interlocking solids separate from one another when said flexible material is activated in an opposite direction of movement, thereby permitting said flexible material to bend and assume a curved configuration.

2. The support member of claim 1 wherein said portions of said adjacent non-interlocking solids further comprise projections and concavities in mateable relationship with said adjacent non-interlocking solids that serve as means for maintaining linear alignment of said support member.

3. The support member of claim 1 wherein said plurality of said adjacent non-interlocking solids are attached to one side of said flexible material.

4. The support member of claim 1 wherein said plurality of said adjacent non-interlocking solids restrict bending of said flexible material in one direction of movement when said flexible material is in a straightened configuration.

5. The support member of claim 1 wherein said length of flexible material and said adjacent non-interlocking solids are in the form of a single construct.

6. The support member of claim 1 wherein said adjacent non-interlocking solids each have a profile substantially in the shape of a capital letter "T."

7. The support member of claim 1 wherein said flexible material is metallic.

8. The support member of claim 7 wherein the metallic material is in the form of a flat strip.

9. The support member of claim 8 further comprising a series of holes in said strip for attaching said adjacent non-interlocking solids.

10. The support member of claim 1 wherein said flexible material is polymeric.

11. The support member of claim 1 wherein said adjacent non-interlocking solids are made of a metallic material.

12. The support member of claims 11 wherein said adjacent non-interlocking solids are substantially similar in volume.

13. The support member of claim 1 wherein said adjacent non-interlocking solids are made of a polymeric material.

14. The support member of claim 13 wherein said adjacent non-interlocking solids are substantially similar in volume.

15. The support member of claim 1 further comprising an envelope surrounding said support member and at least one channel disposed substantially in parallel with said support member and attached to said envelope.

16. The support member of claim 15 wherein said channel is contiguous with said envelope.

17. The support member of claim 15 further comprising at least one conductor located within said at least one channel.

18. The support member of claim 15 wherein said envelope and said at least one channel comprise a polymeric material.

19. The support member of claim 18 wherein said polymeric material comprises polytetrafluoroethylene.

20. The support member of claim 15 wherein said envelope and said at least one channel are both a composite of urethane and polytetrafluoroethylene.

21. The support member of claim 20 wherein said polytetrafluoroethylene is expanded porous polytetrafluoroethylene.

22. A support member for an assembly having a range of motion in one direction and essentially no range of motion in an opposite direction, said support member comprising:
  a length of flexible material;
  a plurality of non-interlocking solids attached to said flexible material; and
  at least one filament attached to said plurality of non-interlocking solids, wherein said at least one filament restricts motion of said flexible material in one direction of movement, and wherein said at least one filament does not restrict motion of said flexible material in an opposite direction of movement, thereby permitting said flexible material to bend and assume a curved configuration.

23. The support member of claim 22 wherein said non-interlocking solids are substantially similar in volume.

24. The support member of claim 22 wherein said non-interlocking solids are attached to one side of said flexible material.

25. The support member of claim 22 wherein said filament does not increase in length more than about 4 percent before breaking.

26. The support member of claim 22 wherein said flexible material and said filament appear substantially parallel when said support member is fully extended.

27. The support member of claim 22 further comprising a space between said non-interlocking solids.

28. The support member of claim 22 wherein said filament is metallic.

29. The support member of claim 28 wherein said metallic filament is stainless steel.

30. The support member of claim 22 wherein said filament comprises a polymeric material.

31. The support member of claim 30 wherein said polymeric material is an aramid fiber.

32. The support member of claim 22 wherein said flexible material is metallic.

33. The support member of claim 32 wherein the metallic material is in the form of a flat strip.

34. The support member of claim 33 further comprising a series of holes in said strip for attaching said non-interlocking solids.

35. The support member of claim 22 wherein said flexible material is polymeric.

36. The support member of claim 22 wherein said non-interlocking solids are made of a metallic material.

37. The support member of claim 22 wherein said non-interlocking solids are made of a polymeric material.

38. The support member of claim 22 further comprising an envelope surrounding said support member and at least one channel disposed substantially in parallel with said support member and attached to said envelope.

39. The support member of claim 38 wherein said channel is contiguous with said envelope.

40. The support member of claim 38 further comprising at least one conductor located within said at least one channel.

41. The support member of claim 38 wherein said envelope and said channel comprise a polytetrafluoroethylene material.

42. The support member of claims 41 wherein said polytetrafluoroethylene is expanded porous polytetrafluoroethylene.

43. The support member of claim 38 wherein said envelope and said channel are both a composite of urethane and polytetrafluoroethylene.

44. The support member of claims 43 wherein said polytetrafluoroethylene is expanded porous polytetrafluoroethylene.

45. A support element having a range of motion in one direction and essentially no range of motion in an opposite direction, said support member comprising:
  a flexible member combined with a plurality of adjacent non-interlocking solids in a single construct, wherein said adjacent non-interlocking solids have portions that contact one another and restrict bending of said flexible member in one direction of movement, and wherein said portions of said adjacent non-interlocking solids separate from one another when said flexible member is activated in an opposite direction of movement, thereby permitting said flexible member to bend and assume a curved configuration.

46. The support element of claim 45 wherein said portions of said adjacent non-interlocking solids further comprise projections and concavities in mateable relationship with said adjacent non-interlocking solids that serve as means for maintaining linear alignment of said support member.

47. The support element of claim 45 wherein said plurality of said adjacent non-interlocking solids are attached to one side of said flexible material.

48. The support element of claim 45 wherein said plurality of adjacent non-interlocking solids restrict bending of said flexible material in one direction of movement when said flexible material is in a straightened configuration.

49. The support element of claim 45 wherein said length of flexible material and said adjacent non-interlocking solids are in the form of a single construct.

50. The support element of claim 45 wherein said adjacent non-interlocking solids each have a profile substantially in the shape of a capital letter "T."

51. The support element of claim 45 wherein said construct is metallic.

52. The support element of claims 51 wherein said adjacent non-interlocking solids are substantially similar in volume.

53. The support element of claim 45 wherein said construct is polymeric.

54. The support element of claims 53 wherein said adjacent non-interlocking solids are substantially similar in volume.

55. The support element of claim 45 further comprising an envelope surrounding said support member and at least one channel disposed substantially in parallel with said support member and attached to said envelope.

56. The support element of claim 55 wherein said channel is contiguous with said envelope.

57. The support element of claim 55 wherein said envelope and said at least one channel are both a composite of urethane and polytetrafluoroethylene.

58. The support element of claim 57 wherein said polytetrafluoroethylene is expanded porous polytetrafluoroethylene.

59. The support element of claim 55 further comprising at least one conductor located within said at least one channel.

60. The support element of claim 55 wherein said envelope and said at least one channel comprise a polymeric material.

61. The support element of claim 60 wherein said polymeric material comprises polytetrafluoroethylene.

62. A support member having a range of motion in one direction and essentially no range of motion in said opposite direction, said support member comprising:
a length of a first flexible polymeric material comprising a plurality of adjacent non-interlocking solids, wherein said adjacent non-interlocking solids have portions that contact one another and restrict bending of said flexible member in one direction of movement, and wherein said portions of said adjacent non-interlocking solids separate from one another when said flexible member is activated in an opposite direction of movement, thereby permitting said flexible member to bend and assume a curved configuration; and
at least one layer of a second flexible polymeric material having at least one reinforcing element embedded therein attached to one side of said first flexible material.

63. The support member of claim 62 further comprising a length of a second flexible material comprising a plurality of non-interlocking solids attached to an opposite side of said at least one layer of material.

64. The support member of claim 62 wherein said plurality of adjacent non-interlocking solids restrict bending of said flexible polymeric material in one direction of movement when said flexible polymeric material is in a straightened configuration.

65. The support member of claim 62 wherein said reinforcing element is made of a metallic material.

66. The support member of claim 65 wherein the metallic material is in the form of a round filament.

67. The support member of claim 65 wherein the metallic material is in the form of a flat strip.

68. The support member of claim 67 further comprising a series of holes in said strip for attaching said adjacent non-interlocking solids.

69. The support member of claim 62 wherein said reinforcing element is made of a polymeric material.

70. The support member of claim 62 wherein said solids are substantially similar in volume.

71. The support member of claim 62 further comprising an envelope surrounding said support member and at least one channel disposed substantially in parallel with said support member and attached to said envelope.

72. The support member of claim 71 wherein said channel is contiguous with said envelope.

73. The support member of claim 71 further comprising at least one conductor located within said at least one channel.

74. The support member of claim 71 wherein said envelope and said at least one channel comprise a polymeric material.

75. The support member of claim 74 wherein said polymeric material comprises polytetrafluoroethylene.

76. The support member of claim 71 wherein said envelope and said at least one channel are both a composite of urethane and polytetrafluoroethylene.

77. The support member of claim 76 wherein said polytetrafluoroethylene is expanded porous polytetrafluoroethylene.

78. A support member having a range of motion in one direction and essentially no range of motion in an opposite direction, said support member comprising:
a continuous strip of material comprising a series of adjacent non-interlocking, motion-limiting, solids, wherein said adjacent non-interlocking solids have portions that contact one another and restrict bending of said flexible member in one direction of movement, and wherein said portions of said adjacent non-interlocking solids separate from one another when said flexible member is activated in en opposite direction of movement, thereby permitting said continuous strip to bend and assume a curved configuration, and
at least one reinforcing element embedded in said continuous strip.

79. The support member of claim 78 wherein said adjacent non-interlocking solids restrict bending of said flexible polymeric material in one direction of movement when said flexible polymeric material is in a straightened configuration.

80. The support member of claim 78 wherein said reinforcing element is made of a metallic material.

81. The support member of claim 80 wherein the metallic material is in the form of a round filament.

82. The support member of claim 80 wherein the metallic material is in the form of a flat strip.

83. The support member of claim 82 further comprising a series of holes in said strip for attaching said adjacent non-interlocking solids.

84. The support member of claim 78 wherein said reinforcing element is made of a polymeric material.

85. The support member of claim 78 wherein said solids are substantially similar in volume.

86. The support member of claim 78 further comprising an envelope surrounding said support member and at least one channel disposed substantially in parallel with said support member and attached to said envelope.

87. The support member of claim 86 wherein said channel is contiguous with said envelope.

88. The support member of claim 86 further comprising at least one conductor located within said at least one channel.

89. The support member of claim 86 wherein said envelope and said at least one channel comprise a polymeric material.

90. The support member of claim 89 wherein said polymeric material comprises polytetrafluoroethylene.

91. The support member of clam 86 wherein said envelope and said at least one channel are both a composite of urethane and polytetrafluoroethylene.

92. The support member of claim 91 wherein said polytetrafluoroethylene is expanded porous polytetrafluoroethylene.

* * * * *